US008692424B2

(12) United States Patent
Bohrer et al.

(10) Patent No.: US 8,692,424 B2
(45) Date of Patent: Apr. 8, 2014

(54) STATOR WITH CAVITY FOR RETAINING WIRES AND METHOD OF FORMING THE SAME

(75) Inventors: Jeffrey R. Bohrer, St. Peters, MO (US); Daniel E. Bailey, Ballwin, MO (US); Michael W. Major, Moro, IL (US); Daniel E. Hilton, St. Louis, MO (US); Gregory M. Levine, Olivette, MO (US); Barry M. Newberg, Florissant, MO (US); James R. Gore, Paragould, AR (US); Mark D. Piatt, Paragould, AR (US)

(73) Assignee: Nidec Motor Corporation, St. Louis, MO (US)

( * ) Notice: Subject to any disclaimer, the term of this patent is extended or adjusted under 35 U.S.C. 154(b) by 638 days.

(21) Appl. No.: 12/703,992

(22) Filed: Feb. 11, 2010

(65) Prior Publication Data

US 2011/0193433 A1 Aug. 11, 2011

(51) Int. Cl.
| | |
|---|---|
| *H02K 3/38* | (2006.01) |
| *H02K 15/14* | (2006.01) |
| *H02K 5/24* | (2006.01) |
| *H02K 3/34* | (2006.01) |
| *H02K 1/16* | (2006.01) |
| *H02K 3/52* | (2006.01) |

(52) U.S. Cl.
CPC *H02K 3/345* (2013.01); *H02K 1/16* (2013.01); *H02K 3/522* (2013.01); *H02K 5/24* (2013.01)
USPC .......... 310/43; 310/51; 310/71; 310/216.113; 29/596

(58) Field of Classification Search
CPC ......... H02K 3/345; H02K 1/16; H02K 3/522; H02K 5/24
USPC .................................. 310/43, 71, 51; 29/596
IPC ......................... H02K 11/00, 3/38, 15/14, 5/24
See application file for complete search history.

(56) References Cited

U.S. PATENT DOCUMENTS

| 5,920,135 A * | 7/1999 | Ohshita ........................... 310/71 |
| 6,825,586 B2 * | 11/2004 | Edrington ....................... 310/71 |
| 2004/0119350 A1* | 6/2004 | Miya et al. ..................... 310/71 |
| 2004/0232785 A1* | 11/2004 | Yamada et al. ................. 310/71 |
| 2005/0194860 A1* | 9/2005 | Lee ............................... 310/217 |
| 2006/0006758 A1* | 1/2006 | Yamada ......................... 310/194 |
| 2006/0028092 A1* | 2/2006 | Wang et al. .................... 310/260 |
| 2006/0043806 A1* | 3/2006 | Torii et al. ....................... 310/71 |
| 2011/0193433 A1* | 8/2011 | Bohrer et al. .................... 310/71 |

FOREIGN PATENT DOCUMENTS

| EP | 1404007 A1 | 3/2004 |
| GB | 2333647 A | 7/1999 |
| JP | 3979457 B2 | 9/2007 |
| WO | 0129953 A1 | 4/2001 |
| WO | 2004114502 A1 | 12/2004 |
| WO | 2007136145 A2 | 11/2007 |
| WO | 2008027535 A2 | 3/2008 |

\* cited by examiner

*Primary Examiner* — John K Kim
(74) *Attorney, Agent, or Firm* — Thompson Coburn LLP

(57) ABSTRACT

A stator comprises a cavity formed into the insulator of the windings. The non-wound wire sections that extend from the windings and the electrical conductors attached thereto are housed within the cavity. A cap locks onto the stator insulator and prevents the non-wound sections of wire from migrating out of the cavity.

8 Claims, 9 Drawing Sheets

STATOR WITH CAVITY FOR RETAINING WIRES AND METHOD OF FORMING THE SAME

CROSS-REFERENCE TO RELATED APPLICATIONS

Not Applicable

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains generally to electric motors and generators. More specifically, this invention pertains to stators wherein the non-wound sections of wire that lead from the windings are retained within a cavity formed in the stator.

2. General Background

In most electric motors and generators, protecting and restraining the non-wound sections of wire that extend from and are formed integrally with the windings is important. This is particularly the case with stators of the type found in direct drive laundry washing machines. Prior art methods of restraining such wires, the electrical conductors that are attached thereto, and the junctions between them include the use of numerous cable ties to secure the wires and connectors tightly against the stator body. However, such cable ties are time consuming to install and can result in inconsistencies between assembled stators. Still further, such prior art methods do not protect the wires, conductors, and junctions from abrading against foreign object debris or against other components that move, vibrate, or rotate relative to the stator.

SUMMARY OF THE INVENTION

The present invention provides stators with an efficient means for retaining and protecting the non-wound sections of wire, electrical conductors, and the junctions therebetween. Such components are retained within a cavity that is formed in the stator and that is capped in a manner that retains and protects the components.

In one aspect of the invention, a stator comprises a core formed of ferromagnetic material. The core has a plurality of teeth arranged circumferentially about an axis. The stator also comprises a plurality of wire coils. Each of the wire coils is wound around a respective one of the core's teeth. The stator further comprises at least two non-wound sections of wire that extend from the plurality of wound wire coils, and at least two electrical conductors. Each of the electrical conductors is electrically connected to a respective one of the non-wound sections of wire in a manner forming an electrical junction. Still further, the stator comprises first and second retaining members that are secured to each other. The first and second retaining members substantially enclose a cavity that extends circumferentially about a substantial portion of the core. The cavity houses at least a portion of the non-wound sections of wire.

In another aspect of the invention, a stator comprises a core formed of ferromagnetic material. The core has a plurality of teeth arranged circumferentially about an axis. The stator also comprises a plurality of wire coils. Each of the wire coils is wound around a respective one of the stator's teeth. The stator further comprises at least two non-wound sections of wire that extend from the plurality of wire coils, and at least two electrical conductors. Each of the electrical conductors is joined to a respective one of the non-wound sections of wire in manner forming an electrical junction. Still further, the stator comprises a cavity and a cap. The cavity extends at least partially around the axis in an arcuate manner. The non-wound sections of wire and the electrical junctions are positioned in the cavity. The electrical conductors extend out of the cavity. The cap extends at least partially around the axis in an arcuate manner and is secured to the cavity in a manner that prevents the non-wound sections of wire from migrating out of the cavity.

In yet another aspect of the invention, a stator comprises a core formed of ferromagnetic material. The core has a plurality of teeth arranged circumferentially about an axis. The stator also comprises an electrical insulator that has a plurality of teeth arranged circumferentially about the axis. The teeth of the electrical insulator are aligned with the teeth of the core. The stator further comprises a plurality of wire coils. Each of the wire coils is wound around a respective one of the teeth and a corresponding one of the teeth of the electrical insulator. Still further, the stator comprises at least two non-wound sections of wire that extend from the plurality of wound wire coils, and at least two electrical conductors. Each of the electrical conductors is electrically connected to a respective one of the non-wound sections of wire in a manner forming an electrical junction. The electrical conductors are secured to the electrical insulator in a manner such that forces acting on portions of the electrical conductors cannot be transferred to the electrical junctions.

In still another aspect of the invention, a method of assembling a stator comprises attaching a stator insulator to a stator core. The stator core has a plurality of teeth formed of ferromagnetic material that are arranged circumferentially about an axis. The stator insulator comprises a cavity. The method also comprises winding wire around the teeth of the stator core in a manner forming a plurality of wire coils that are each wound about a respective one of the teeth of the stator core, and in a manner forming a least two non-wound sections of wire that extend from the wire coils. The method further comprises attaching each of at least two electrical conductors to a respective one of the non-wound sections of wire in manner forming an electrical junction, routing the non-wound sections of wire and the electrical conductors in the cavity of the stator insulator, and attaching a cap to the stator insulator in a manner such that the non-wound sections of wire are retained between the cap and the stator insulator.

Further features and advantages of the present invention, as well as the operation of the invention, are described in detail below with reference to the accompanying drawings.

Figure 1:
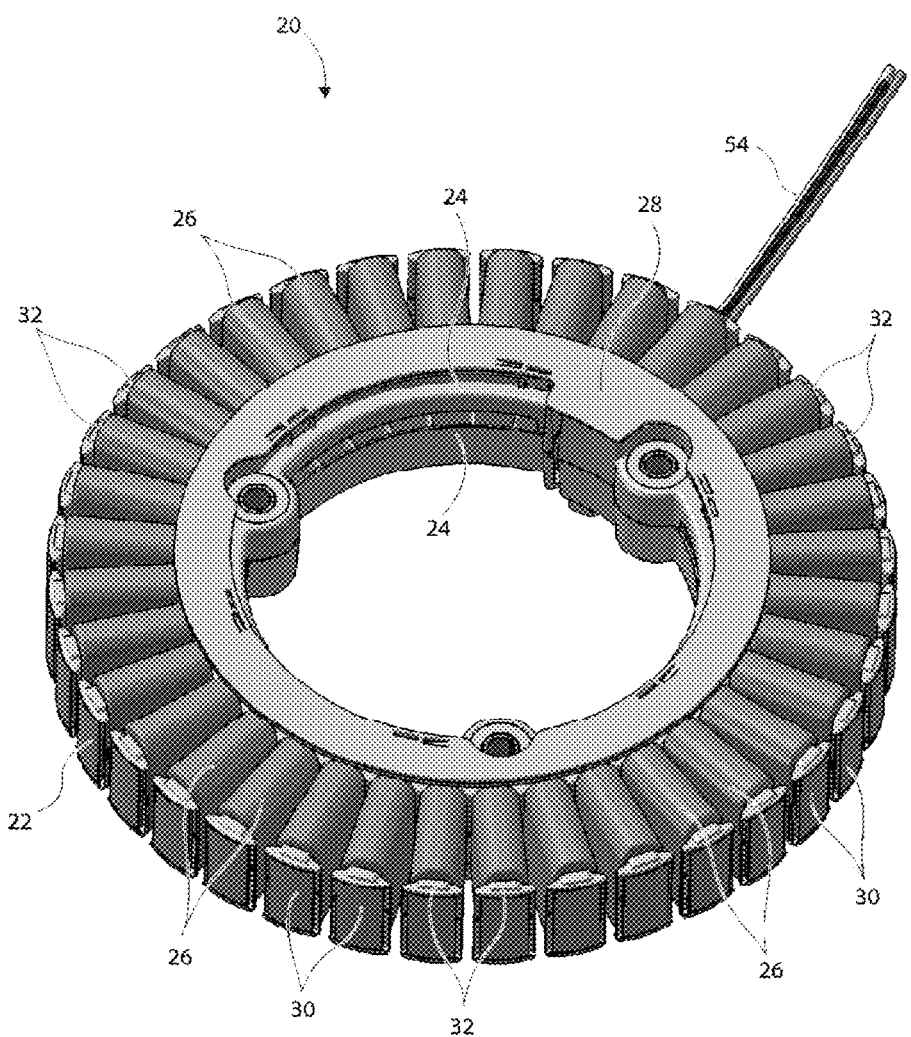
FIG. 1 is a perspective view of an embodiment of a stator in accordance with the invention.

Reference numerals in the written specification and in the drawing figures indicate corresponding items.

DETAILED DESCRIPTION

Figure 2:
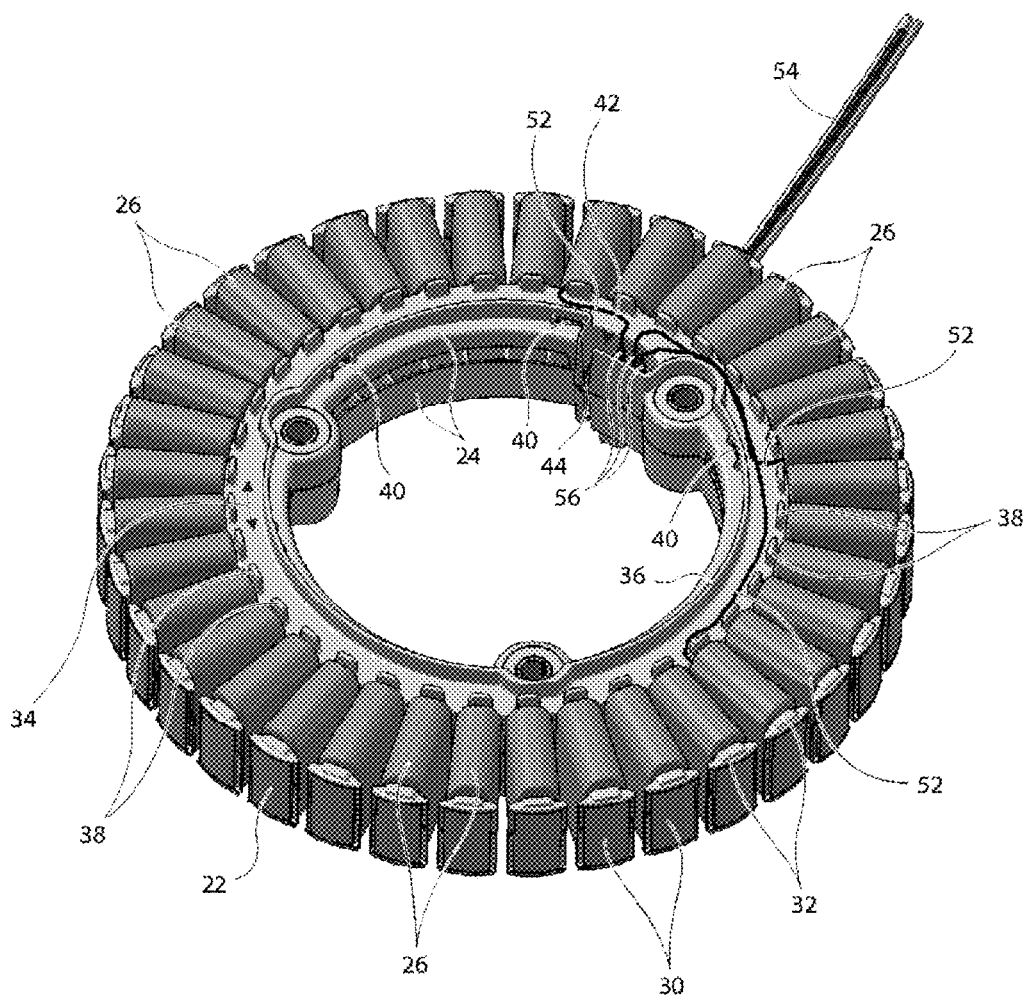
FIG. 2 is a perspective view of the stator of FIG. 1 with its cap omitted.
Figure 3:
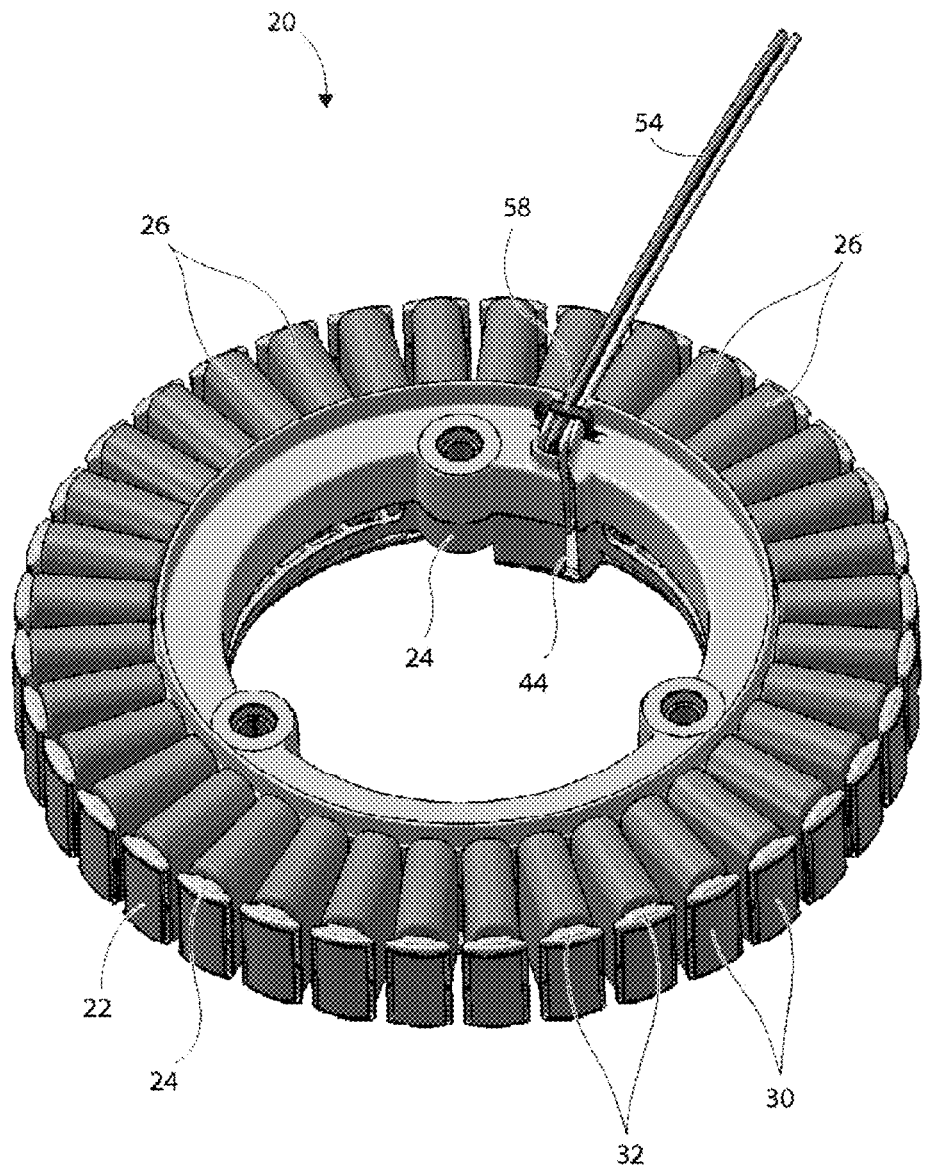
FIG. 3 is a bottom perspective view of the stator of FIG. 1.
Figure 4:
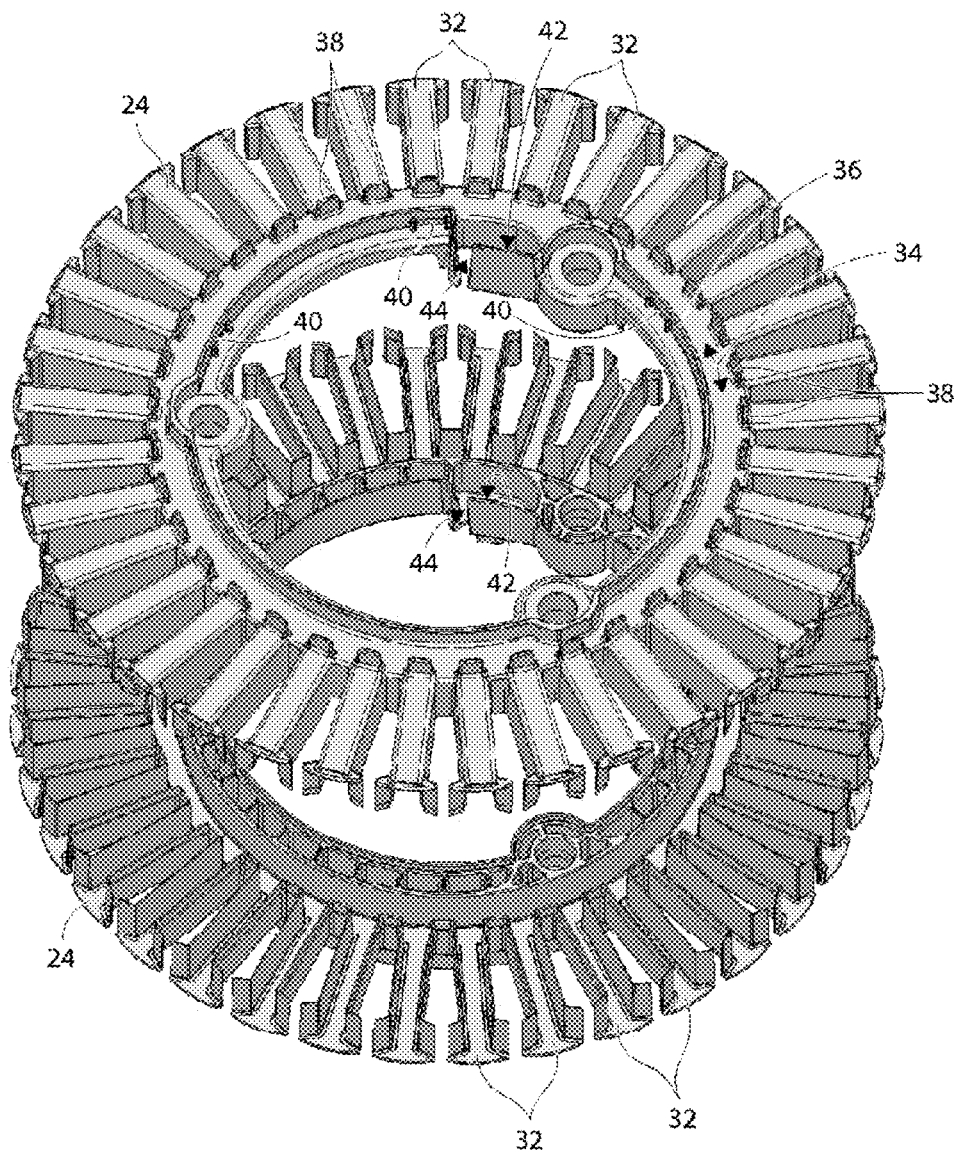
FIG. 4 is a perspective exploded view of the insulator components of the stator of FIG. 1.
Figure 9:
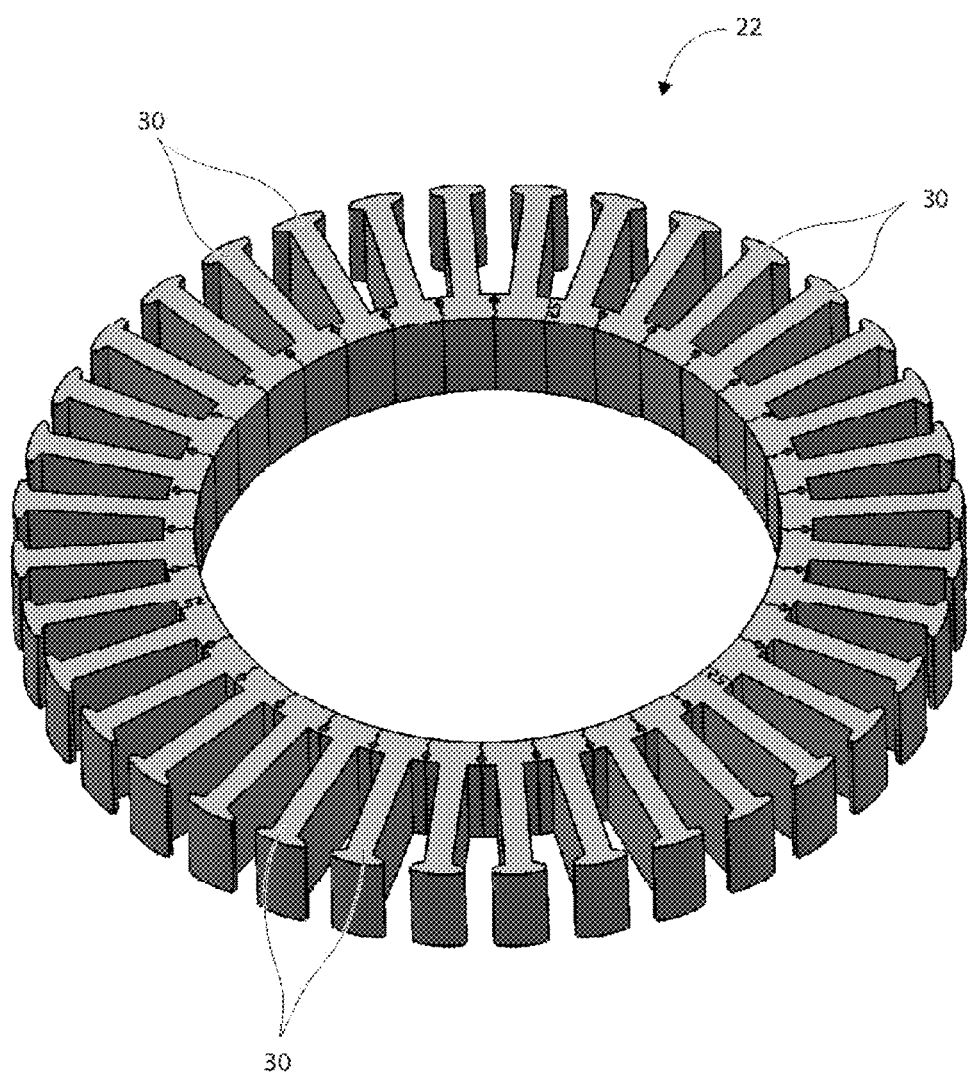
FIG. 9 is a perspective view of the stator core.

An exemplary embodiment of a stator, generally indicated by reference numeral 20, in accordance with the invention is shown in FIGS. 1, 2, and 3. The stator 20 comprises a core 22, first and second stator insulator components 24, windings 26, and a cap 28. The core 22 is formed of a ferromagnetic material and comprises a core of laminations (individual laminations not shown). As shown most clearly in FIG. 9, the core 22 forms an annular ring around a central axis and comprises a plurality of teeth 30 that extend radially outward from the central axis.

Figure 5:
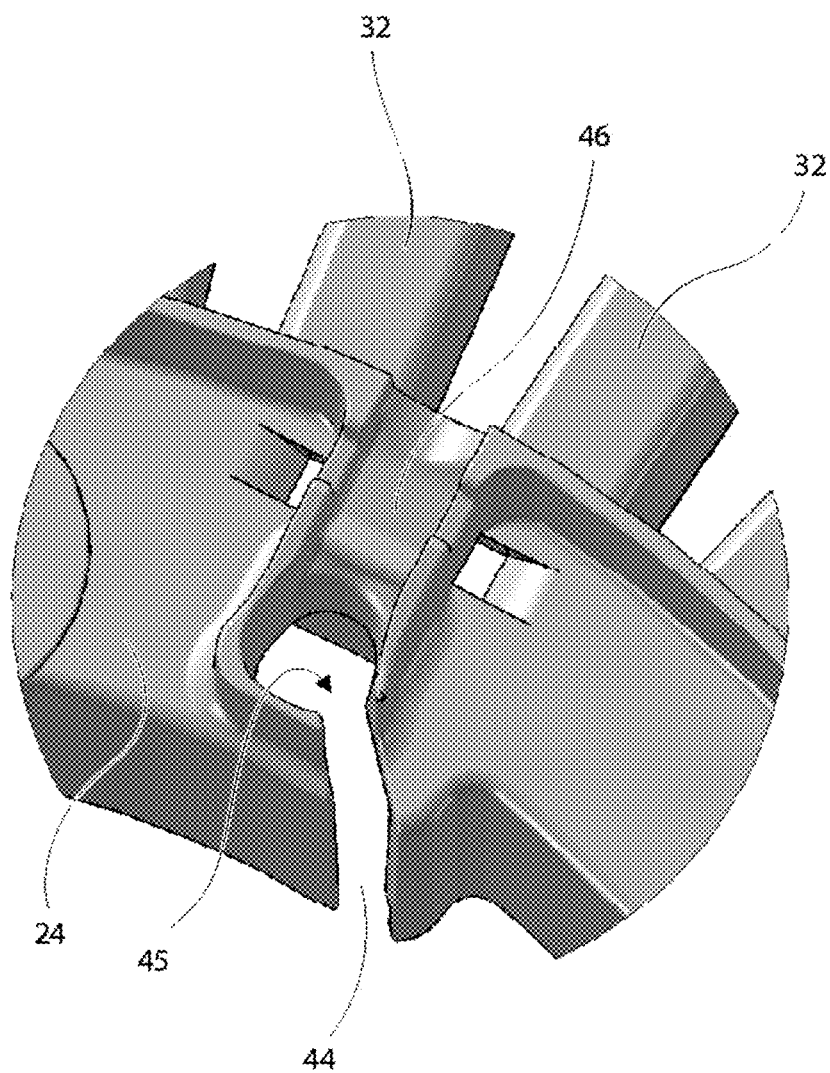
FIG. 5 is a detail perspective view of the lower insulator component by itself showing the cable tie fitting on the bottom thereof.

The stator insulator components 24 electrically insulate the teeth 30 of the core 22 from the windings 26. Like the core 22 itself, each of the insulator components 24 forms an annular ring around the central axis and comprises a plurality of teeth 32 that extend radially outward from the ring. The core 22 is sandwiched between the insulator components 24. The teeth 32 of the two insulator components 24 engage each other in a manner encircling each of the teeth 30 of the core 22. The upper insulator component 24 comprises an annular channel 34 that extends between an upwardly protruding rim 36 and a plurality of upwardly protruding tabs 38 that are circumferentially spaced from each other about the annular ring. The rim 36 extends in generally an arcuate manner and comprises several snap-lock recesses or openings 40. A recess 42 extends downwardly though the upper insulator component 24 and into lower insulator component from the channel 34 along one side of the stator 20. A vertical slit 44 extends through the insulator components into the recess 42. The slit extends 44 to an opening 45 (see FIG. 5) in the lower insulator component 24. As detailed in FIG. 5, a cable tie fitting 46 is formed in the lower insulator component 24 adjacent the opening 45.

Figure 6:
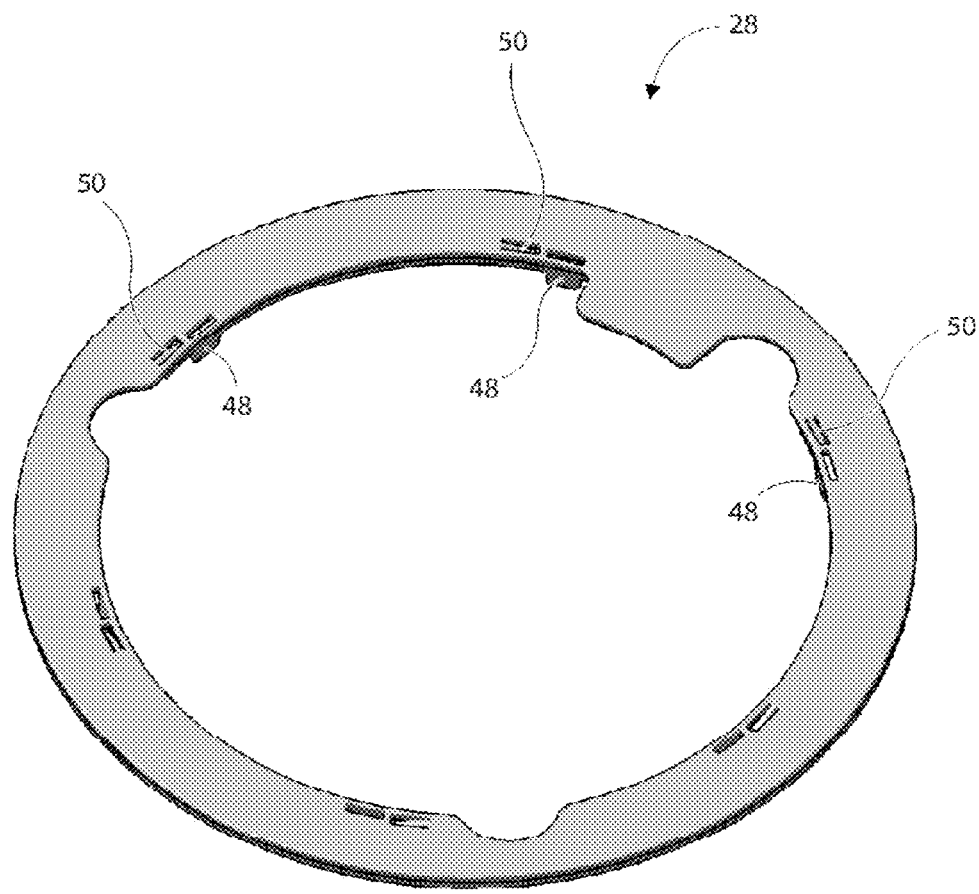
FIG. 6 is a perspective view of the cap of the stator by itself.
Figure 7:
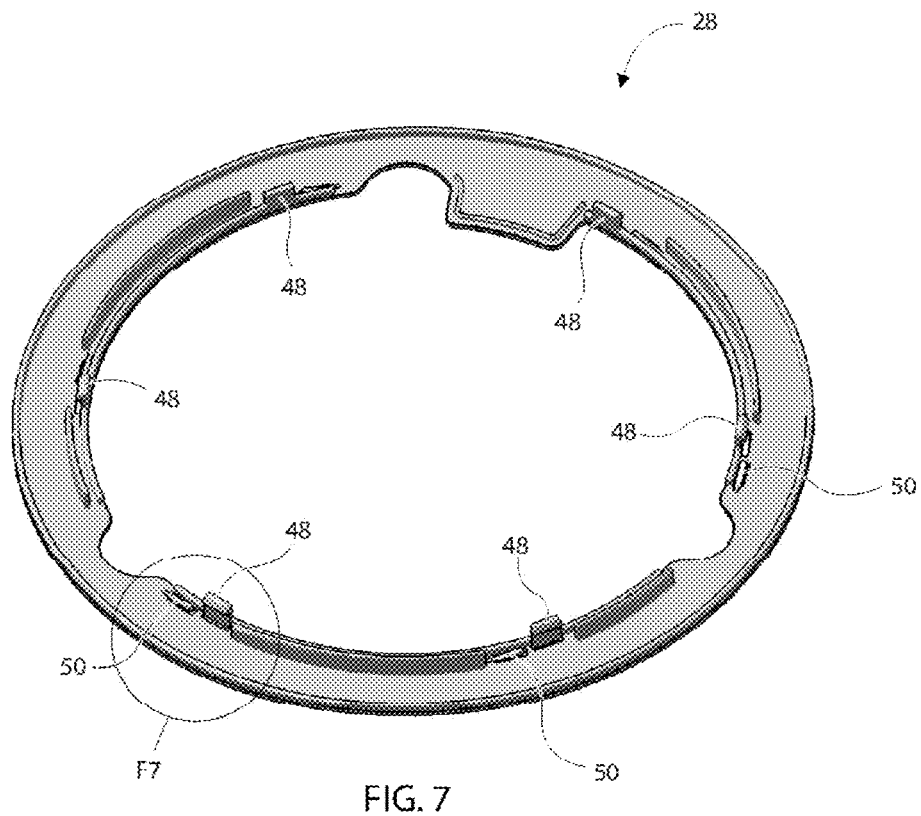
FIG. 7 is a bottom perspective view of the cap of FIG. 5.
Figure 8:
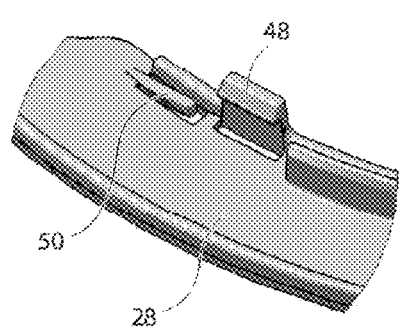
FIG. 8 is a detail bottom perspective view of the cap of FIG. 5.

The cap 28 forms an annular ring and, as shown in FIGS. 6 and 7, comprises several locking tabs 48 and biasing protrusions 50. The cap 28 is dimensioned to cover the channel 34 of the upper insulator component 24. When assembled to the upper insulator component 24, the locking tabs 48 of the cap 28 cooperate with the snap-lock openings 40 on the rim 36 of the upper insulator component 24 in a manner that automatically locks the cap to the upper insulator component. However, prior to this locking action, the biasing protrusions 50 of the cap 28 engage the rim 36 of the upper insulator component and must be resiliently deflected in order to engage the locking tabs 48 with the snap-lock openings 40. As such, after the cap 28 is locked to the upper insulator component 24 via the locking tabs 48 and the snap-lock openings 40, the biasing protrusions 50 create a biasing force that eliminates any slack between the cap and insulator component to prevent the cap from rattling against the insulator component.

The stator 22 is assembled by first sandwiching the stator core 22 between the insulator components 24. Thereafter, wire is wound about each of the teeth 30 of the core 22 to form the windings 26. It should be appreciated that the wire is wound also around each of the teeth 32 of the insulator components 24, forming wire coils, such that the wire coils do not directly contact the core 22. After forming the windings 26, several non-wound sections of wire 52 (FIG. 2), extend from the windings and are routed in the channel 34 of upper insulator component 24. The free end of each of these non-wound sections of wire 52 is then attached to the end of an electrical conductor, such as a sheathed electrical conductor 54, in a manner forming an electrical junction 56 between the non-wound sections of wire and the electrical conductor. Other electrical conductors, such as terminals, are also contemplated as being within the scope of the invention. The electrical conductors 54 are then slipped through the slit 44 formed in the insulator components 24 and into the recess 42. Portions of the electrical conductors 54 extend out of the opening 45 of the lower insulator component 24. In the exemplary embodiment depicted here, the distance in which the electrical conductors 54 extend into the stator 20 is short enough so that the junctions 56 between the non-wound sections of wire 52 and electrical conductors are positioned in the recess 42 of the insulator components 24. The electrical conductors 54 are then bent over against the cable tie fitting 46 and a cable tie 58 is placed around the fitting and the electrical conductors in a manner securing them together (see FIG. 3). The assembly of the stator 20 is completed by attaching the cap 28 to the upper insulator component 24 in the manner described above.

As assembled, the cap 28, the channel 34, and the recess 42 define the bounds of a cavity that captures the non-wound sections of wire 52 and the junctions 56. Trapped in the cavity, the non-wound sections of wire 52 and junctions 56 are protected and can not migrate into nearby rotating objects. Thus, the insulting components 24 and the cap 28 collectively act as retaining members for retaining the unwound section of the wire coils 52 and the junctions 56.

Figure 10:
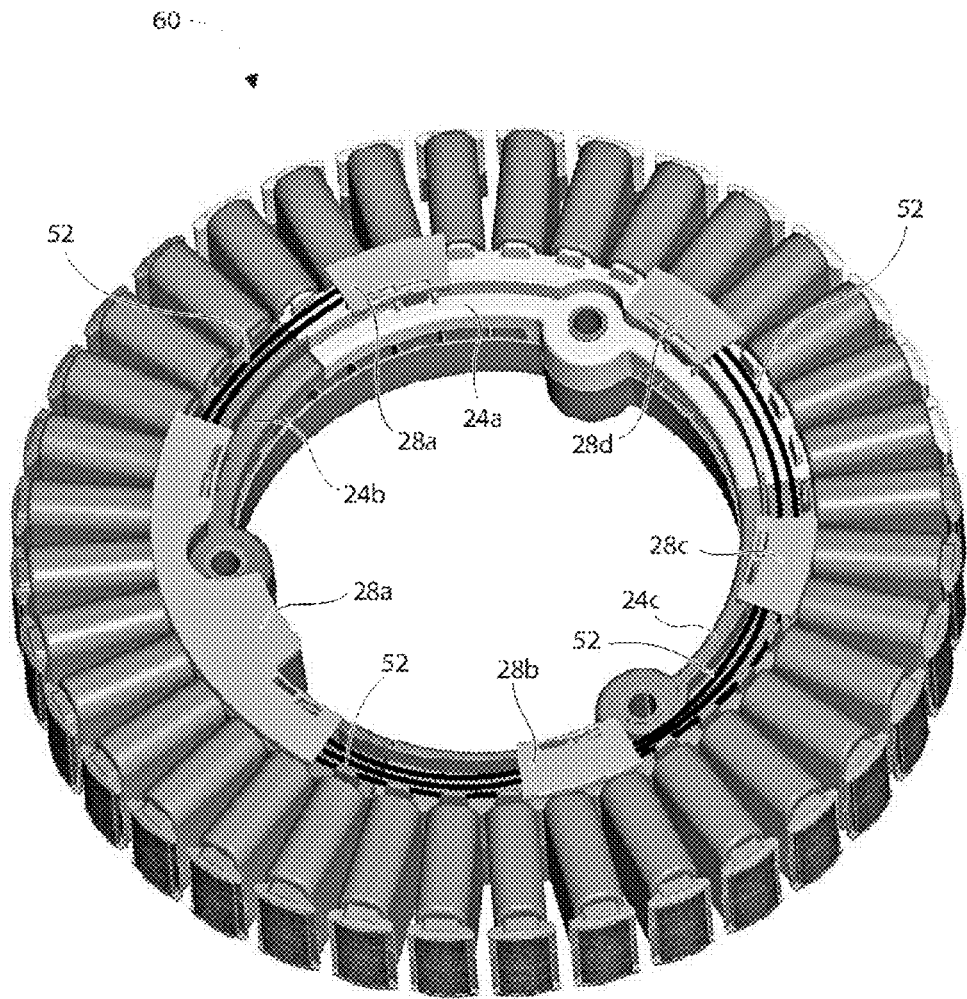
FIG. 10 is a perspective view of a second embodiment of a stator in accordance with the invention.

A second embodiment of a stator 60 in accordance with the invention is shown in FIG. 10. The second stator 60 is identical to the stator 20 described above, with a few exceptions. Unlike the first stator 20, the upper insulator of the second stator 60 is formed by a plurality of insulating components 24a, 24b, 24c that each form third of a ring. Collectively, the plurality of insulating components 24a, 24b, 24c function in the same manner as the upper insulating component 24 of the first stator 20. Similarly, the second stator 60 comprises a plurality of caps 28a, 28b, 28c, 28d, 28e that are each snapped to one of the upper insulating components 24a, 24b, 24c. Unlike the cap 28 of the first stator 20, the caps 28a, 28b, 28c, 28d, 28e of the second stator 60 do not form a ring. Nonetheless, the caps 28a, 28b, 28c, 28d, 28e of the second stator 60 are configured to retain the unwound sections of the windings in the channel formed by the of the upper insulating components 24a, 24b, 24c. It should be appreciated that the number of insulating components and caps could be more or less than is shown in FIG. 10. It should also be appreciated that caps need not be equally spaced about the circumference of the stator.

In view of the foregoing, it should be appreciated that the invention achieves the several advantages over prior art stators.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A stator comprising:
    a core formed of ferromagnetic material, the core having a plurality of teeth arranged circumferentially about an axis;
    a plurality of wire coils, each of the wire coils being wound around a respective one of the teeth;
    at least two non-wound sections of wire extending from the plurality of wound wire coils;
    at least two sheathed electrical conductors, each of the electrical conductors being electrically connected to a respective one of the non-wound sections of wire in a manner forming an electrical junction; and
    first and second retaining members that are secured to each other, the first and second retaining members substantially enclosing a cavity that extends about a substantial portion of the core, the cavity housing the electrical junctions and at least portions of the non-wound sections of wire, each of the electrical conductors being secured to the first retaining member in a manner defining first and second portions of said electrical conductor, the first portion of each of the electrical conductors operatively connecting the respective electrical junction to the second portion of said electrical conductor, at least part of each of the second portions of the electrical conductors being external to the cavity, the first retaining member being an electrical insulator and comprising a plurality of teeth arranged circumferentially about the axis, the teeth of the first retaining member being aligned with the teeth of the core, each of the wire coils being wound around a respective one of the teeth of the core and a corresponding one of the teeth of the first retaining member, the first retaining member comprising a ring-shaped channel, the second retaining member comprising a cap, the cap and channel binding the cavity.

2. A stator in accordance with claim 1 wherein the cap forms a ring, and the first retaining member and the cap are secured to each other via interlocking geometry.

3. A stator in accordance with claim 2 wherein the cap comprises resiliently deflected biasing portions that limit movement of the first retaining member relative to the second retaining member.

4. A stator in accordance claim 1 wherein the first retaining member comprises two monolithic components that each partially enclose the cavity.

5. A stator comprising:
    a core formed of ferromagnetic material, the core having a plurality of teeth arranged circumferentially about an axis;
    a plurality of wire coils, each of the wire coils being wound around a respective one of the teeth;
    at least two non-wound sections of wire extending from the plurality of wire coils;
    at least two sheathed electrical conductors, each of the electrical conductors being joined to a respective one of the non-wound sections of wire in manner forming an electrical junction;
    an electrical insulator comprising a plurality of teeth arranged circumferentially about the axis, the teeth of the electrical insulator being aligned with the teeth of the core, and each of the wire coils being wound around a respective one of the teeth of the core and a corresponding one of the teeth of the electrical insulator, a cavity being formed in the electrical insulator, the cavity extending at least partially around the axis, the non-wound sections of wire and the electrical junctions being positioned in the cavity, each of the electrical conductors being secured to the electrical insulator in a manner defining first and second portions of said electrical conductor, the first portion of each of the electrical conductors operatively connecting the respective electrical junction to the second portion of said electrical conductor, at least part of each of the second portions of the electrical conductors being external to the cavity; and
    a cap extending at least partially around the axis and being fixed in position relative to the cavity in a manner that prevents the non-wound sections of wire from migrating out of the cavity, the cavity forming a ring, the cap forming a ring, the cavity and the cap being fixed in position relative to each other via interlocking geometry.

6. A stator in accordance with claim 5 wherein the cap comprises resiliently deflected portions that bias the cap in a direction relative to the cavity in a manner that prevents slack between the interlocking geometry of the cap and cavity.

7. A method of assembling a stator, the method comprising:
    attaching a stator insulator to a stator core, the stator core having a plurality of teeth formed of ferromagnetic material that are arranged circumferentially about an axis, the stator insulator comprising a plurality of teeth arranged circumferentially about the axis and a cavity, the teeth of the stator insulator being aligned with the teeth of the stator core;
    winding wire around the teeth of the stator core in a manner forming a plurality of wire coils and at least two non-wound sections of wire, each of the wire coils being wound around a respective one of the teeth of the stator core and a corresponding one of the teeth of the stator insulator, the non-wound sections of wire extending from the plurality of wire coils;
    attaching each of at least two sheathed electrical conductors to a respective one of the non-wound sections of wire in manner forming an electrical junction;
    routing the non-wound sections of wire, the electrical junctions, and the electrical conductors in the cavity of the stator insulator;
    attaching a cap to the stator insulator in a manner such that the non-wound sections of wire and the electrical junctions are retained between the cap and the stator insulator and such that portions of the electrical conductors are external to the cavity; and
    securing each of the electrical conductors to at least one of the stator insulator and the cap in a manner defining first and second portions of said electrical conductor, the first portion of each of the electrical conductors operatively connecting the respective electrical junction to the second portion of said electrical conductor, at least part of each of the second portions of the electrical conductors being the portions of the electrical conductors that are external to the cavity, the step of securing each of the electrical conductors to at least one of the stator insulator and the cap comprising securing a cable tie through an opening of the stator insulator such that the cable tie passes through the opening and encircles the electrical conductors in a manner such that forces acting on the second portions of the electrical conductors are transferred to the electrical insulator adjacent the opening.

8. A method of assembling a stator, the method comprising:

attaching a stator insulator to a stator core, the stator core having a plurality of teeth formed of ferromagnetic material that are arranged circumferentially about an axis, the stator insulator comprising a plurality of teeth arranged circumferentially about the axis and a cavity, the cavity of the stator insulator comprises an arcuate channel and a junction box, the teeth of the stator insulator being aligned with the teeth of the stator core;

winding wire around the teeth of the stator core in a manner forming a plurality of wire coils and at least two non-wound sections of wire, each of the wire coils being wound around a respective one of the teeth of the stator core and a corresponding one of the teeth of the stator insulator, the non-wound sections of wire extending from the plurality of wire coils;

attaching each of at least two sheathed electrical conductors to a respective one of the non-wound sections of wire in manner forming an electrical junction;

routing the non-wound sections of wire, the electrical junctions, and the electrical conductors in the cavity of the stator insulator in a manner such that the non-wound sections of wire extend within the channel and into the junction box and the electrical junctions are retained in the junction box; and attaching a cap to the stator insulator in a manner such that the non-wound sections of wire and the electrical junctions are retained between the cap and the stator insulator and such that portions of the electrical conductors are external to the cavity.

* * * * *